P. L. ROOKLEDGE & G. W. GILLESPIE.
VEHICLE SPRING.
APPLICATION FILED NOV. 30, 1910.
1,044,692. Patented Nov. 19, 1912.
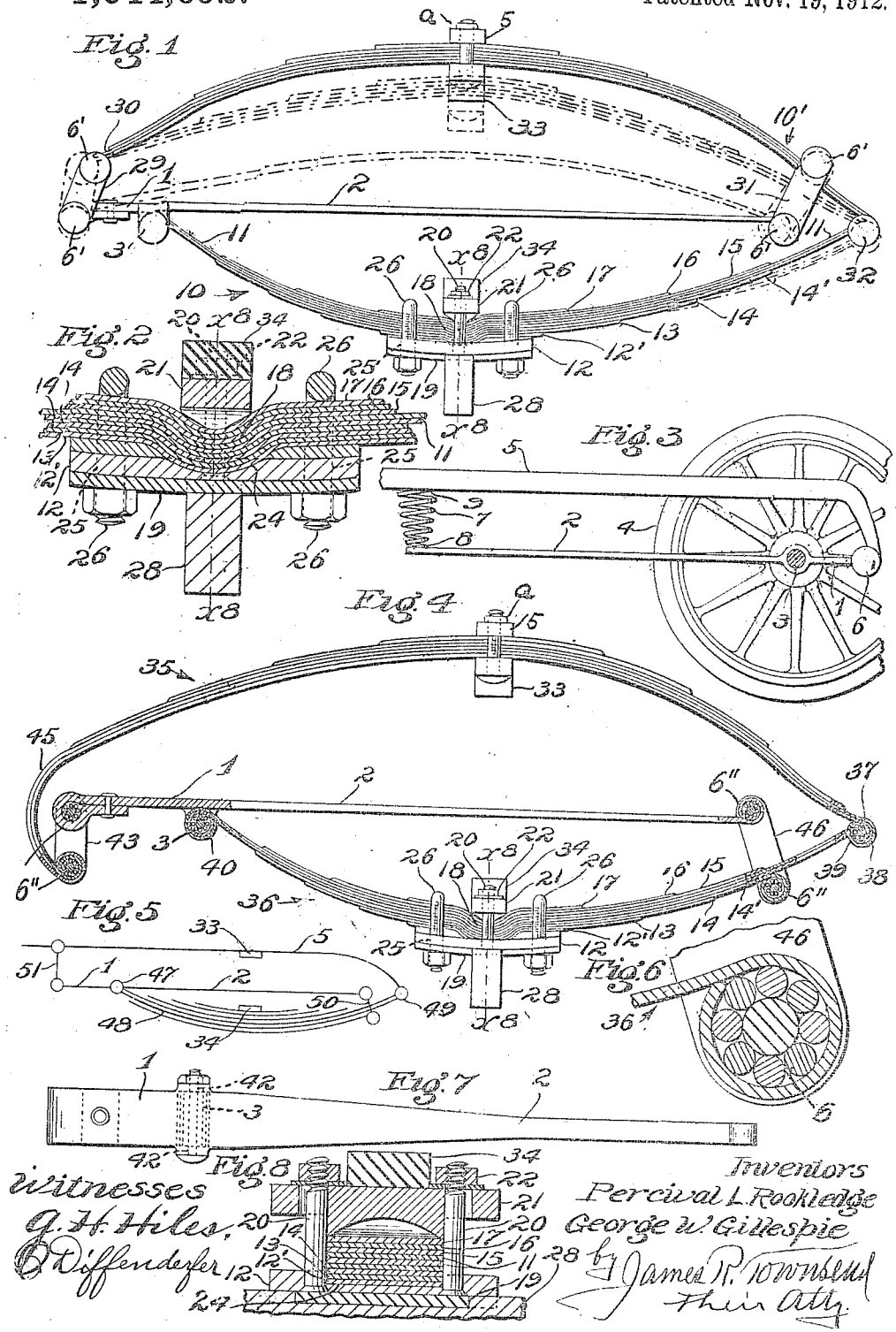
Witnesses
G. H. Hiles
O. Diffenderfer
Inventors
Percival L. Rookledge
George W. Gillespie
by James R. Townsend
Their Atty.

UNITED STATES PATENT OFFICE.

PERCIVAL L. ROOKLEDGE AND GEORGE W. GILLESPIE, OF CAMBRIA, CALIFORNIA.

VEHICLE-SPRING.

1,044,692.   Specification of Letters Patent.   Patented Nov. 19, 1912.

Application filed November 30, 1910. Serial No. 594,985.

*To all whom it may concern:*

Be it known that we, PERCIVAL L. ROOKLEDGE and GEORGE W. GILLESPIE, both citizens of the United States, residing at Cambria, in the county of San Luis Obispo and State of California, have invented a new and useful Vehicle-Spring, of which the following is a specification.

This invention relates to yielding supports in which one or more springs are interposed between two bodies to be yieldingly separated as the axle and chassis of an automobile; and the object of the invention is to provide a spring which will afford a gently yielding resilient support for light and heavy loads alike; the resistance of the spring increasing and decreasing as the burden of the spring increases and decreases.

The invention may be carried out in various forms and we shall illustrate and describe the invention in those forms at present deemed most desirable for general use on automobiles and like vehicles.

This invention may be carried out in various ways and includes certain combinations and arrangements of elements more particularly set forth in the subjoined detail description.

The accompanying drawings illustrate the invention.

Figure 1 is a side elevation of the invention applied in a form comprising a full elliptic spring. Fig. 2 is a fragmental, longitudinal sectional detail of the middle of the lower spring body and its support. Fig. 3 is a view illustrating a feature of the invention as applied in its simplest form. Fig. 4 is a view, partly in section, illustrating the invention as applied in another form. Fig. 5 is a diagrammatic view illustrating the invention as applied with a semi-elliptic spring. Fig. 6 is an enlarged sectional detail to show a typical bearing of the shackles and the fulcrum. Fig. 7 is a plan of the typical lever spring. The fulcrum connection shown in Fig. 4 is shown and indicated in solid and dotted lines. Fig. 8 is a fragmentary cross section on line $x^8$—$x^8$, Figs. 1, 2 and 4.

One spring member is arranged as a lever of the first-class having relatively rigid and resilient arms 1, 2, respectively arranged on opposite sides of the fulcrum 3 to which the lever spring 1, 2, is journaled by a ball or roller-bearing. In some instances the fulcrum may be the axle of a wheel 4 said axle being one of the bodies to be resiliently separated and the chassis 5 or parts fixed thereto, being the other of such bodies.

In Fig. 3 the chassis 5 of the vehicle is shown connected to the short arm 1 of the lever spring by the roller bearing 6 and a coil compression spring 7 having a bearing 8 resting on the end of the resilient arm 2 and the bearing 9 resting against the chassis forms the connection between the long resilient arm 2 and the upper body. It is thus seen that the spring lever having a long resilient arm 2 and the short arm 1 may be connected more or less directly with the supported body.

In the form shown in Fig. 1 the full elliptic spring composed of two semi-elliptic spring bodies 10 and 10' is shown and the lever spring 1, 2, is interposed between said spring bodies.

It is thus seen that the bodies to be separated by the resiliency of the spring lever 1, 2, may be resilient or non-resilient elements as occasion requires.

Referring now more particularly to Fig. 1 the lower spring body 10 comprises the main leaf 11, bottom plate 12, and reinforcing leaves 12', 13, 14 and 14', and top-reinforcing leaves 15, 16, 17; the leaves being crooked and having the crooks nested together as shown at 18 in Figs. 2 and 4. The lower spring body 10 is secured to the axle plate 19 by clip bolts 20 and a yoke 21; the latter being seated in the crook 18 and held in place by the nuts 22 upon the clip bolts 20 which are fastened to the plate 12 that is provided with a seat 24 to seat the crook 18 and is also provided with perforations 25 to receive the axle clips 26 which extend through the spring plate 12 and through the axle plate 19 which is fastened to the axle 28. By this means the lower spring body is solidly secured to the axle. The top leaves 15, 16 and 17 are for the purpose of supporting the main leaf against the up pull of the spring when it is working.

The fulcrum 3 of the lever spring 1, 2, shown in Fig. 1 is mounted on one tip of the main leaf 11 and the short comparatively rigid arm 1 is connected by a shackle 29 with the end of the main leaf 30 of the top half of the spring. The main leaves 11 and 30 of the lower and upper spring bodies 10, 10' may each comprise one or more members, and are shown in the drawings as consisting of two members.

The resilient arm 2 of the lever spring is connected at its tip by a shackle 31 with one of the bodies to be yieldingly separated; the adjacent tips of the upper and lower half of the elliptic spring being connected by the joint 32. A bumper 33 is provided at the middle of the upper spring body 10', being fixed thereto and to the chassis 5 by a clip a and another bumper 34 is provided on the lower spring body 10. Said bumpers are preferably resilient.

In Fig. 3 the under-side of the chassis 5 forms a substitute for the bumper 33 and under heavy loads the limber arm 2 will bend up as the chassis 5 descends so that its intermediate part will contact with the under-side of the chassis 5 thus being separated in such a manner as to shorten the leverage and consequently stiffen the lever arm 2 which is stiffened to support the load.

In Fig. 4 the upper and lower spring bodies 35, 36 are connected by a bolt 37 and return bends 38, 39 of the main leaves; said return bends encircling the bolt. The top and bottom limbs of the spring on this side of the clip are of equal length. The other arm of the lower body 36 of the spring is shorter than the corresponding arm of the upper body of said spring and is bent over at the end to form the eye 40 through which the fulcrum 3 is inserted to fulcrum the lever spring to that end, which is provided with eyes 42 for said fulcrum.

The shackle 43 connects the comparatively rigid short arm 1 of the lever spring with the end of the upper spring body 35; the ends of the main leaf 45 of the upper spring body being bent around the end of the lever and connected with the lower bearing of the shackle. The resilient arm 2 of the lever spring is connected by a shackle 46 with the long arm of the lower spring body.

In the half elliptic form shown in Fig. 5 the lever is fulcrumed at 47 at one end to the half spring 48. The other end of the half spring is jointed at 49 to the chassis 5; the resilient end 2 of the lever is connected by a shackle 50 with the long end of the lower half spring and the stiff short end 1 of said lever spring is connected by a shackle 51 with the chassis.

Assuming that in Figs. 1 and 4 the springs are attached to the rear axle, the lever spring is fulcrumed at the rear end of the lower body of the spring and the resilient arm 2 is shackled to the front of the elliptic spring. The shackles in Figs. 1, 4 and 5 are rigid links the ends of which are pivotally connected with the parts which said shackles connect.

The connection between the lever spring composed of the arms 1, 2 may be made more or less directly with the ends of the upper half of the elliptic spring. In Fig. 1 said lever spring 1, 2 is connected by means of the shackles 29 and 31 which are pivotally connected at their lower ends with the lever and at the upper ends with the ends of the spring body 10' by roller-bearings 6' substantially the same as the roller-bearing 6 shown in Fig. 3 and detailed in Fig. 6.

In Fig. 4 the roller-bearings 6" correspond to the roller-bearings 6 and 6', but the end of the long resilient arm 2 of the spring lever is connected less directly with the upper spring body 35, a portion of the lower spring 36 being interposed between the upper spring body 35 and the shackle 46 so that greater resiliency is provided for than in the case of Fig. 1.

Bumpers 33 in Figs. 1 and 4 project down from the upper bodies 10' and 35 and the resilient arm 2 of the lever spring in each of the Figs. 1, 3 and 4 is sufficiently long and limber to bow under heavy loads into contact with the upper body thus affording a resilient stop to offer great resistance to undue depression of the spring.

The lever spring may be constructed in any desired form, but is preferably drawn down in width from the fulcrum to the tip. The object of this lever spring is to make a light spring which will act when the vehicle is running light. Weight on the body of the vehicle will exert pressure on the end of the short rigid arm 1, and this, of course, is resisted at the fulcrum 3 and is transmitted through the resilient arm 2 to the other end of the spring, causing the resilient arm to bow upward as indicated in dotted lines in Fig. 1.

With a heavier load the bow of the resilient arm 2 rises and the bumper 33 lowers until the bumper rests on the resilient arm, thereby operating through the lever to press upward through the shackle 29 and downward on the fulcrum 3 and through the shackle 31 in Fig. 1. This applies pressure to all of the limbs of the spring until the resilient arm 2 rests on the lower bumper 34, whereupon further addition to the load will be supported by the bumpers as well as the springs.

It is thus seen that the spring adjusts itself to the load until the bumpers support the load. When the load is light the lever spring is in action. As the load increases the resistance of the spring increases in proportion therewith so that the spring will make a light car run easily and the full strength of the spring is utilized when the car is heavily loaded.

By fulcruming a lever spring of the form shown between two bodies that are to be resiliently separated a light acting spring is provided, and by supporting the fulcrum on another spring a greater range of resiliency is secured and the range is further increased by connecting one or both of the ends of the lever spring with other spring members and the greatest range is secured by the provision of the full elliptic spring bodies connected with the lever spring and provided with a bumper to compress the resilient arm of the lever spring, all of the spring elements being between the bodies to be separated.

In practical use, when the lever arm 2, under strain or pressure comes up against the bumper 33 in Fig. 1, thus introducing into action the shorter lever which extends between the bumper 33 and the fulcrum 3; all the resiliency of this part 2 of the lever is taken up and the action of the whole spring comes into play.

Pressure or weight on the top spring in the case of the full elliptic spring or on the body of the car in the case of a half-elliptic spring causes the lever to bow upward until it engages the bumper and after the lever engages the bumper, before the car can compress the springs further, it is necessary for the pressure to straighten out the limb 2 and in doing so it has a tendency to elevate the end of the spring at 30 or 45 as the case may be.

It is thus seen that a broadly novel feature of this invention is the provision between two bodies to be resiliently separated of a lever spring between and connected with said bodies and having a limber arm that is capable of bending intermediate its ends until it comes into contact with said other body or an element connected therewith so that the leverage of the resilient arm becomes shortened and said arm is comparatively stiffened to support the load.

We claim:—

1. A spring for resiliently separating two bodies; said spring comprising a lever spring fulcrumed to one of said bodies and comprising relatively rigid and limber arms, swinging shackles connecting the arms of said lever spring with the other of said bodies, the relatively limber arm being arranged and adapted to bend into contact with one of said bodies so as to be thereby supported to form a shorter lever substantially as and for the purpose set forth.

2. A spring for resiliently separating two bodies comprising a lever spring having relatively rigid and resilient arms, the resilient arm being long and limber, a fulcrum between said arms and supported by one of said bodies, connections between the ends of the lever spring and the other body, and a bumper connected with said other body to contact with an intermediate portion of the limber arm to shorten the leverage and to support said arm.

3. A spring for resiliently separating two bodies comprising a lever spring having relatively rigid and resilient arms, a fulcrum between said arms, a spring on one of said bodies supporting the fulcrum and a spring supported by the other body and connected with the ends of the lever spring.

4. A spring for resiliently separating two bodies comprising a lever spring having relatively rigid and resilient arms, a fulcrum between said arms, a spring on one of said bodies supporting the fulcrum, a spring supported by the other body and connected with the ends of the lever spring, and a bumper on the last-named supported spring to contact with the resilient arm of the lever spring.

5. A vehicle spring comprising a lower half elliptic spring formed of a main leaf and upper and lower leaves above and below the main leaf; said leaves being provided with crooks and nested together; a bottom plate; clip bolts and a yoke connecting the plate with the lower half elliptic spring; said yoke being seated in a crook and said plate being provided with a seat in which a crook is seated; an axle means fastening the half elliptic spring to the axle, a fulcrum on one end of the half elliptic spring, a lever spring on the fulcrum; one arm of said lever being resilient; an upper half elliptic spring; a shackle between one end of the lever spring and one end of said upper half elliptic spring, and a shackle between the other end of the lever spring and the other end of the upper half elliptic spring; said other end of the upper half elliptic spring being joined to the end of the lower half elliptic spring.

6. The combination with two bodies to be resiliently separated, of a lever spring, a fulcrum between said lever spring and one of said bodies, and connections between the ends of the lever spring and the other of said bodies; one of the arms of said lever spring being long and limber and adapted and arranged to bow into contact with the other body under heavy loads substantially as set forth.

7. The combination with two bodies to be resiliently separated, of a lever spring, a fulcrum for the lever spring, said fulcrum being supported by one of said bodies, and a spring on the other body connected with the ends of the lever spring; one of the arms of the lever spring being long and limber and capable of bowing under heavy loads into contact with the other body.

8. The combination with two bodies to be resiliently separated, of a lever spring, a fulcrum for said lever spring, a spring on one of said bodies supporting the fulcrum, a spring on the second body connected with the ends of the lever spring and a bumper connected with the second spring and adapted to contact with an arm of the lever spring.

9. The combination with two bodies to be resiliently separated, of two springs connected respectively with said bodies, and a lever spring fulcrumed between and resiliently connecting the springs that are connected with said bodies; one arm of said lever spring being long and capable of bowing into contact with the other body.

10. The combination with two bodies to be resiliently separated, of two springs connected respectively with said bodies, a lever spring fulcrumed between and resiliently connecting the springs that are connected with said bodies and a bumper between the resilient arm of the lever spring and one of the body springs.

11. The combination with two bodies to be resiliently separated, of two springs connected respectively with said bodies, a lever spring fulcrumed between and resiliently connecting the springs that are connected with said bodies and a bumper between the resilient arm of the lever spring and one of the body springs, and a bumper between said resilient arm and the other body spring.

12. The combination with two bodies to be resiliently separated, of two springs connected respectively with said bodies, ball bearing fulcrum, a lever spring fulcrumed by said fulcrum between and resiliently connecting the springs that are connected with said bodies and a bumper between the resilient arm of the lever spring and one of the body springs, and a bumper between said resilient arm and the other body spring.

In testimony whereof, we have hereunto set our hands at Cambria, California, this 22d day of November, 1910.

PERCIVAL L. ROOKLEDGE.
GEORGE W. GILLESPIE.

In presence of—
G. S. Dickie,
R. A. Plaskett.